(12) United States Patent
Lee et al.

(10) Patent No.: US 8,830,421 B2
(45) Date of Patent: Sep. 9, 2014

(54) DISPLAY DEVICE INCLUDING SUB-BACKLIGHT

(75) Inventors: Kyoung Chan Lee, Seoul (KR); Gun Ho Lee, Seoul (KR)

(73) Assignee: Kortek Corporation (KR)

( * ) Notice: Subject to any disclaimer, the term of this patent is extended or adjusted under 35 U.S.C. 154(b) by 97 days.

(21) Appl. No.: 13/735,084

(22) PCT Filed: Jun. 1, 2011

(86) PCT No.: PCT/KR2011/004017
§ 371 (c)(1),
(2), (4) Date: Jan. 7, 2013

(87) PCT Pub. No.: WO2012/005446
PCT Pub. Date: Jan. 12, 2012

(65) Prior Publication Data
US 2013/0135560 A1 May 30, 2013

(30) Foreign Application Priority Data
Jul. 6, 2010 (KR) .................. 10-2010-0065052

(51) Int. Cl.
*G02F 1/1335* (2006.01)
*G02F 1/00* (2006.01)
*G07F 17/32* (2006.01)

(52) U.S. Cl.
CPC ...... *G02F 1/133602* (2013.01); *G07F 17/3211* (2013.01); *G02F 1/00* (2013.01)
USPC ............... 349/62; 349/64; 349/65; 463/32

(58) Field of Classification Search
USPC .................. 349/62, 64, 65; 463/32
See application file for complete search history.

(56) References Cited

U.S. PATENT DOCUMENTS

| | | | |
|---|---|---|---|
| 7,220,181 B2 * | 5/2007 | Okada | 463/32 |
| 7,520,812 B2 * | 4/2009 | Okada | 463/31 |
| 8,004,623 B2 * | 8/2011 | Kim et al. | 349/16 |
| 2011/0116007 A1 | 5/2011 | Park | |

FOREIGN PATENT DOCUMENTS

| | | |
|---|---|---|
| JP | 2007-071897 | 3/2007 |
| JP | 2007-160018 | 6/2007 |
| JP | 2007-268173 | 10/2007 |
| KR | 1020110045753 A | 5/2011 |

OTHER PUBLICATIONS

International Search Report; PCT/KR2011/004017; Int'l File Date: Jun. 1, 2011; Kortek Corporation; 2 pgs.

* cited by examiner

*Primary Examiner* — James Dudek
(74) *Attorney, Agent, or Firm* — Schmeiser, Olsen & Watts LLP

(57) ABSTRACT

A display device including a sub-backlight unit which can prevent the obscure sights caused by light from the light source of the sub-backlight unit arriving on an article or reel of the main display screen and then reflecting in the frontal direction is provided. The sub-backlight unit includes a second light guide panel having an opening part formed therein corresponding to a transparent window, a second light source disposed around the second light guide panel, and a polymer dispersed liquid crystal (PDLC) sheet disposed close to the front side of the opening of the second light guide panel.

10 Claims, 3 Drawing Sheets

DISPLAY DEVICE INCLUDING SUB-BACKLIGHT

TECHNICAL FIELD

The following relates to a display device including a sub-backlight unit and, more particularly, to a display device, which can prevent visual obstruction caused by light reflected forwards by an article or a reel of a main display screen when light emitted from a light source of a sub-backlight unit reaches the article or the reel of the main display screen.

BACKGROUND ART

In recent years, for a slot machine using a rotary reel display unit, a liquid crystal display device has been suggested to invoke interest in a game while exhibiting a wider variety of images. In the slot machine, the liquid crystal display device is disposed in front of a reel and includes a backlight unit which is provided with a light guide panel and a light source disposed at the circumference of the light guide panel. The light guide panel is provided with a transparent window. Further, the transparent window is provided at a rear side thereof with a rotary reel having a symbol mark along a circumference thereof With this structure, a rotary reel display unit at a rear side can be viewed from a front side through the transparent window of the light guide panel and an image related to a game is displayed through the liquid crystal device on the front side, thereby invoking user interest in the game. However, as light fails to be radiated to the transparent window of the light guide panel of the gaming machine, the transparent window of the light guide panel becomes relatively dark and is distinguished from other portions of the display area of the liquid crystal display device or an image displayed through the liquid crystal display device can be blocked at a portion of the transparent window of the light guide panel. In order to solve such problems, the inventor suggested the provision of a sub-backlight unit including a second light guide panel and a second light source at a portion of a rear side of the backlight unit corresponding to the transparent window of the light guide panel (Korean Patent Application No. 10-2009-0102450). The problem of distinguishing the transparent window from other parts or blocking of an image can be solved by boosting radiation of light at a portion of the light guide panel corresponding to the transparent window using the sub-backlight unit.

However, the slot machine including a sub-backlight unit has a problem in that a reel at the rear side of the slot machine cannot be clearly recognized due to a pattern part of the second light guide panel disposed at a portion of the light guide panel corresponding to the transparent window. Further, as light emitted from the second light source disposed at the circumference of the second light guide panel is introduced into the light guide panel and reaches a surface of the reel disposed at the rear side thereof to be reflected forwards thereby, a symbol mark formed along the circumference of the reel cannot be clearly recognized due to the reflected light, causing deterioration in display quality.

Such a problem can also occur not only when a mechanical display device such as a reel, or a liquid crystal display device electronically realizing a reel is disposed at the rear side of the front display device, but also when an article other than the reel is disposed at the rear side of the front display unit.

SUMMARY

The present invention has been made to solve such problems of a display device such as a slot machine in the related art, and it is an aspect of the present invention to provide a display device, which includes a novel sub-backlight unit and is configured to display an image combined by a front display unit and a rear display unit, wherein a separate rear backlight unit is disposed to allow the rear display unit to be visible and to allow an overall area of the front display unit to be illuminated, such that the front display unit can display an entire screen without interruption and express game results, guide messages, and other game related images without restriction, and the rear display unit can be prevented from suffering deterioration in visibility by a second light guide panel or deterioration in display quality caused by reflected light of a light source of the second light guide panel, thereby improving visibility and quality of the rear display unit.

In accordance with one aspect, the present invention provides a display device including a sub-backlight unit, including: a front display unit 10 and a rear display unit 50 disposed at a rear side of the front display unit 10 to allow an image of the rear display unit 50 to be visible through a portion of the front display unit 10, wherein the front display unit 10 includes a display panel 20; a first light guide panel 36 disposed at a rear side of the display panel 20 and having a transparent window 16 through which the rear display unit 50 is visible; a first light source 38 disposed around the first light guide panel 36; a front backlight unit 30 having a reflective sheet 39 disposed at a rear surface of the first light guide panel 36 to reflect light and having an image hole 18 formed corresponding to the transparent window 16; and a sub-backlight unit 40 disposed at a location corresponding to the transparent window 16 on a rear side of the front backlight unit 30, and wherein the sub-backlight unit 40 includes: a second light guide panel 41 having an opening 42 corresponding to the transparent window 16; a second light source 43 disposed at a circumference of the light guide panel 41; and a polymer dispersed liquid crystal (PDLC) sheet 44 disposed close to a front side of the opening 42 of the second light guide panel 41.

An inner circumferential surface of the opening 42 of the second light guide panel 41 may be an inclined surface enlarged from a rear side toward a front side.

A prism sheet 45 may be attached to the inner circumferential surface of the opening 42 of the second light guide panel 41.

An inner circumferential surface of the opening 42 of the second light guide panel 41 may be polished to be opaque.

A light shielding tape 48 may be attached along an outer circumference of the opening 42 of the second light guide panel 41.

The rear display unit 50 may be a rotary reel display unit having a plurality of rows of variable images.

The rear display unit 50 may be one of an LCD, a PDP, an OLED, and an AMOLED.

The rear display unit 50 may be a picture or an article representing an image.

The transparent window 16 of the first light guide panel 36 may be an opening formed corresponding to a location of the rear display unit 50.

A patterned-area section on which a pattern is printed may be formed on an area of the first light guide panel 36 outside the transparent window 16, and a non-patterned area section on which a pattern is not printed may be formed on an area of the first light guide panel 36 corresponding to the transparent window 16.

In the display device according to the present invention, the front backlight unit 30 having the transparent window 16 through which the rear display unit 50 is visible is disposed in the front display unit 10 and the sub-backlight unit 30 is disposed in an area of the front backlight unit 30 corresponding to the transparent window 16. Here, the sub-backlight unit 40 includes the second light guide panel 41 having the opening 42 corresponding to the transparent window 16, the second light source 43 disposed at a circumference of the light guide panel 41, and a polymer dispersed liquid crystal (PDLC) sheet 44 disposed close to a front side of the opening 42 of the second light guide panel 41. Thus, when an image obtained by combining the front display unit 10 and the rear display unit 50 is to be viewed, a power source of the PDLC sheet 44 is set to be visible, with the front backlight unit 30 of the front display unit 10 turned on, and the rear display unit 50 is then turned on. Then, the second light source 43 of the sub-backlight unit 30 is set to be turned on or off according to selection. Further, when the rear display unit 50 is to be blocked and only an image by the front display unit 10 is to be viewed, the power source of the PDLC sheet 44 is set to be opaque and the second light source 43 of the sub-backlight unit 40 is turned on, with the front backlight unit 30 of the front display unit 10 turned on, and the rear display unit 50 is turned off Then, the second light source 43 of the sub-backlight unit 40 is guided through the light guide panel 41 to illuminate the PDLC sheet 44, whereby the PDLC SHEET 44 acts as a light diffusing or scattering sheet and brightly illuminates the transparent window 16. Thus, deterioration in intensity of illumination at the transparent window 16 or in visibility of the transparent window 16 due to an undulating pattern of the second light guide panel in the related art can be prevented.

In addition, according to the present invention, since the inner circumferential surface of the opening 42 of the second light guide panel 41 is formed as an inclined surface enlarged from a rear side toward a front side such that light emitted from a circumferential surface of the opening 42 of the second light guide panel 41 is guided forward, the light is prevented from proceeding toward the rear display unit 50. Thus, light from the second light source 43 can be prevented from being reflected towards the rear display unit 50, thereby making it possible to prevent deterioration in visibility and display quality.

Further, according to the present invention, since the prism sheet 45 is attached to the inner circumference of the opening 42 of the second light guide panel 41, light emitted from the second light guide panel 41 is guided only toward the PDLC sheet 44 instead of being radiated over a wide area, thereby further improving intensity of illumination of the PDLC sheet 44 and preventing light emitted from the second light source 43 from proceeding toward the rear display unit 50 and undergoing unnecessary reflection.

Furthermore, according to the present invention, the inner peripheral surface of the opening 42 of the second light guide panel 41 is polished to be opaque such that light emitted from the second light source 43 can be uniformly dispersed, thereby preventing a clear reflected image of the second light source 43 from being formed on the rear display unit 50.

Furthermore, according to the present invention, the light shielding tape 48 is attached along the outer circumference of the opening 42 of the second light guide panel 41 to prevent light emitted from the second light source 43 from reaching the rear display unit 50 along the outer circumference of the opening 42 of the second light guide panel 41, thereby preventing unnecessary reflection of light.

BRIEF DESCRIPTION

DETAILED DESCRIPTION

Figure 1:
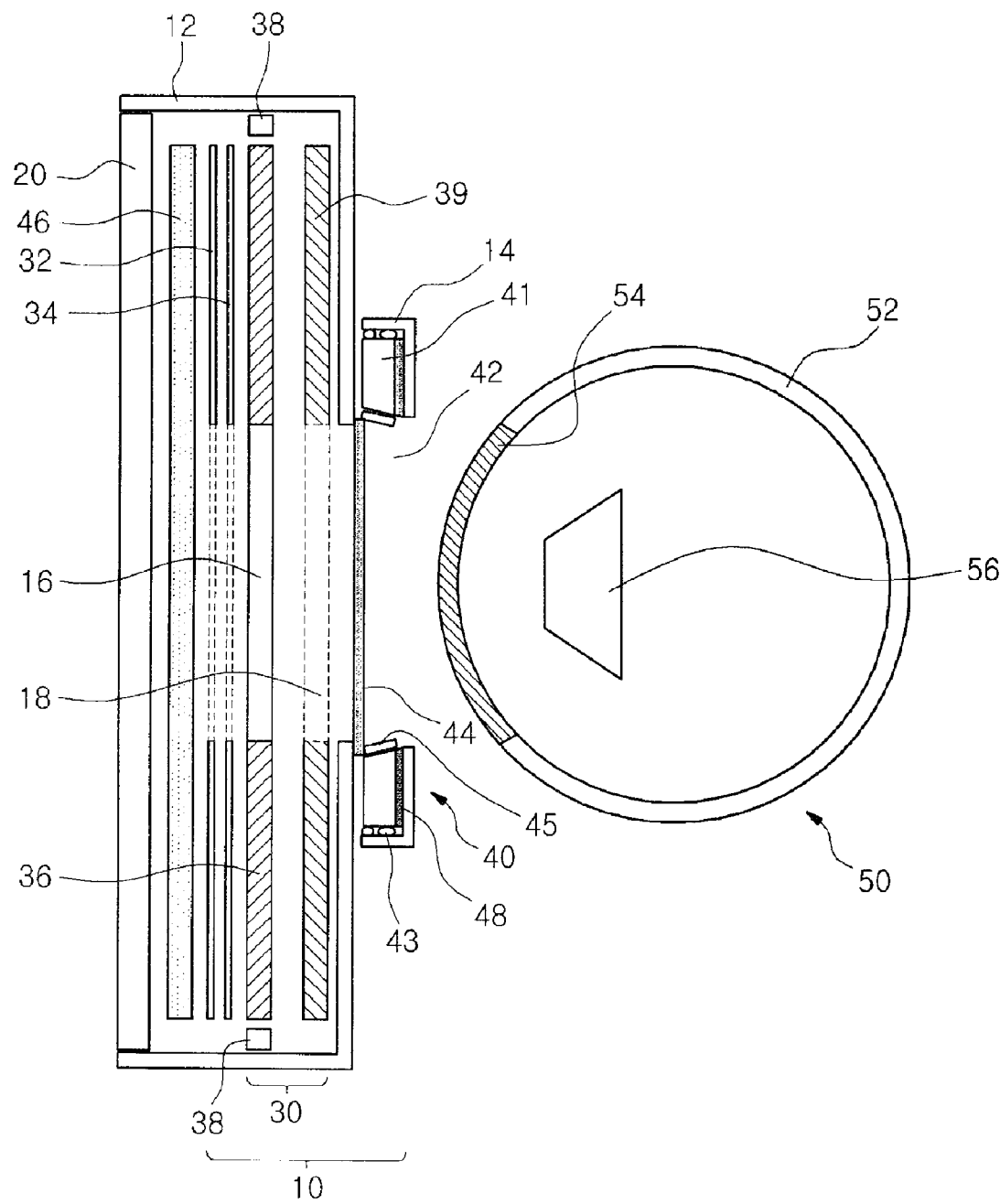
FIG. 1 is a sectional view of a display device in accordance with one exemplary embodiment of the present invention.
Figure 2:
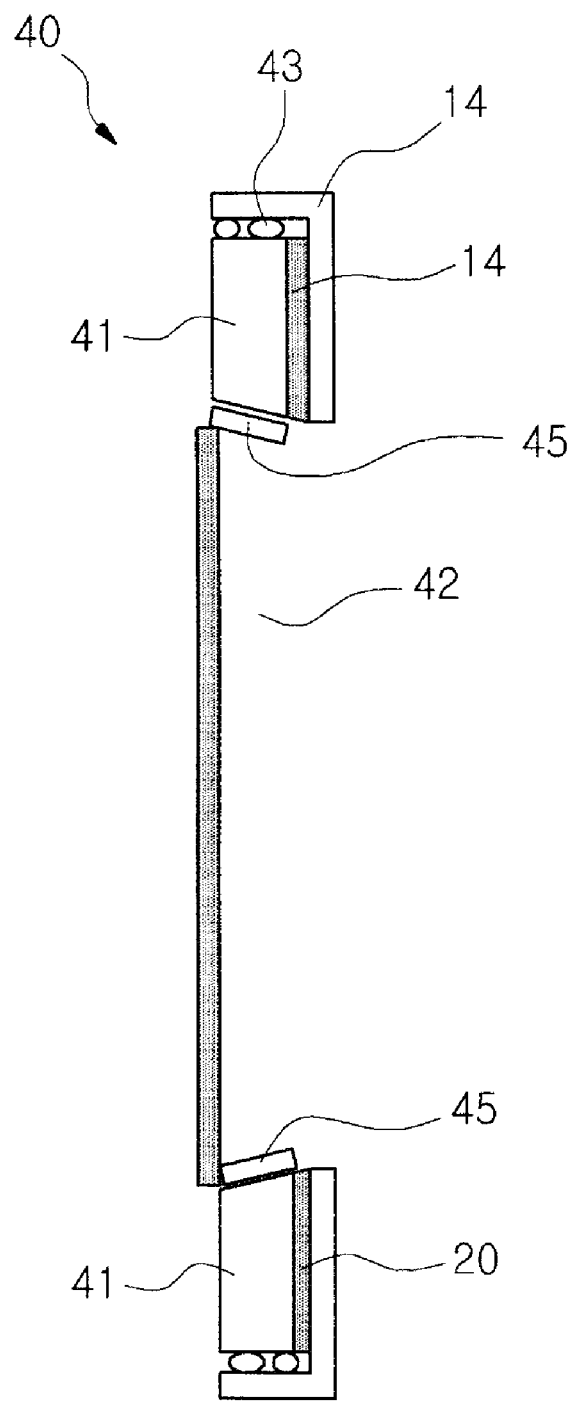
FIG. 2 is a partially enlarged view of a main part of the display device in accordance with the exemplary embodiment of the present invention.

Hereafter, exemplary embodiments of the present invention will be described with reference to the accompanying drawings. FIG. 1 is a sectional view of a display device in accordance with one exemplary embodiment of the present invention, and FIG. 2 is a partially enlarged view of a main part of the display device in accordance with the exemplary embodiment of the present invention.

The present invention relates to a display device which displays an image obtained by combining a front display unit and a rear display unit disposed at a rear side of the front display unit. Such a display device may be used in gaming devices such as slot machines, or may be used in various forms such as other types of gaming devices, 3D solid image display devices, and electronic picture frames. In the embodiment shown in FIG. 1, a liquid crystal display unit is used as a front display unit and a rotary reel display unit is used as a rear display unit. The rotary reel display unit may variably display symbol marks printed on a reel band to provide a game result according to combination of symbol marks. However, in another embodiment, another type of display unit may be used as the rear display unit. For example, a display unit, such as an LCD, a PDP, an OLED and an AMOLED, or a picture or an article, for example jewelry, which represents an image, may be used as the rear display unit.

Referring to FIG. 1, a display panel 20, a front optical shutter 46, a front backlight unit 30, and a rear backlight unit 40 constitute a multilayered structure of a front display unit 10. A rear display unit 50 is disposed at a rear side of the front display unit 10. The display panel 20 may be a liquid crystal display panel, and has a structure wherein polarizing films are disposed on front and rear surfaces of the panel to which a TFT substrate and a color filter are bonded, respectively. The front optical shutter 46 is disposed at a rear side of the display panel 20. The front optical shutter 46 optically transmits or blocks light of the front backlight unit 30 according to selection. That is, when voltage is applied, the front optical shutter 40 transmits light such that the rear display unit 50 is visible from a front side, and when a voltage is not applied, the front optical shutter 40 blocks light such that the rear display unit 50 is invisible, whereby screen uniformity can be improved or calibrated by diffusing light emitted from the front backlight unit 30 or the rear backlight unit 40.

As shown therein, the front backlight unit 30 includes optical sheets such as a prism sheet 32 and a diffusion sheet 34, a first light guide panel 36, a first light source 38, and a reflective sheet 39. The prism sheet 32 is an optical sheet for condensing light and the diffusion sheet 34 is an optical sheet for dispersing light to obtain uniformity of light. Such optical sheets may be selectively used or may be replaced by other optical sheets. Further, the front backlight unit may include a protective sheet. A partially opened image hole 18 is formed in each of the optical sheets such that the rear display unit 50 is visible therethrough.

The first light guide panel 36 receives light through a side surface thereof to emit light through a front surface thereof when the light is emitted from the first light source 38 disposed at a circumference thereof, and is made of transparent acryl. The first light source 38 may be a CCFL or an LED. In the embodiment of the invention, the first light guide panel 36 is formed with the transparent window 16 through which the rear display unit 50 is visible. The transparent window 16 is a non-light emitting area and is not affected by light emitted from the front backlight unit 30. Thus, even when a screen is displayed on the display panel 20, the rear display unit 50 can be viewed through the transparent window 16.

In the embodiment shown in FIG. 1, the transparent window 16 is formed by forming an opening at a central portion of the first light guide panel 36. Alternatively, although not shown in the drawings, a patterned-area section, on which a predetermined pattern for refracting or scattering light, for example, a dot pattern, is printed or formed, is formed on an area of the first light guide panel 36 outside the transparent window 16, and a non-patterned area section on which such a pattern is not formed is formed on an area of the first light guide panel 36 corresponding to the transparent window 16 and functions as a transparent window.

The reflective sheet 39 is disposed on a rear surface of the first light guide panel 36 to reflect light, and is formed with an image hole 18 corresponding to the transparent window 16 as in the aforementioned optical sheet. The reflective sheet 39 may be provided by attaching a reflective film to a front side of a protective glass sheet.

The display panel 20 and the front backlight unit 30 of the front display unit 10 are received in a single main frame 12.

Further, according to the present invention, the sub-backlight unit 40 is disposed at a portion of the front backlight unit 30 corresponding to the transparent window 16. The sub-backlight unit 40 includes a second light guide panel 41 disposed within a sub-frame 14 and having an opening 42 at a portion corresponding to the transparent window 16, a second light source 43 disposed at a circumference of the second light guide panel 41, and a polymer dispersed liquid crystal (PDLC) sheet 44 disposed close to a front side of the opening 42 of the second light guide panel 41.

An inner circumferential surface of the opening 42 is an inclined surface which is gradually enlarged from the rear side toward the front side, that is, from a side of the rear display unit 50 toward the front backlight unit 30 to guide light of the sub-backlight unit 40 toward the PDLC sheet 44. Further, a prism sheet 45 is attached to the inner circumferential surface of the opening 42 to allow light emitted from the inner circumferential surface of the opening 42 to travel straight in order to prevent the light from being unnecessarily diffused and reflected by the rear display unit 50, thereby preventing deterioration in visibility or display quality.

The PDLC sheet 44 contains liquid crystals dispersed in a polymer and is formed without using a polarizing film. The PDLC sheet 44 blocks light while functioning as a diffusion sheet through an irregular arrangement of liquid crystal molecules when voltage is not applied thereto, and is switched to a light transmitting state through regular arrangement of the liquid crystal molecules upon application of voltage thereto. In this way, the PDLC sheet 44 functions as an optical shutter such that the rear display unit 50 is visible when light can be transmitted therethrough, and the PDLC sheet functions as a light diffusing or scattering sheet of the sub-backlight unit 40, so that the transparent window 16 may be prevented from being distinguished from an area except for the transparent window 16 or exhibiting low intensity of illumination by increasing the intensity of illumination at the transparent window 16. In this way, when the PDLC sheet 44 is used as the light diffusing sheet for the transparent window 16, it is possible to prevent a problem caused by a light guide panel disposed on the transparent window 16 to increase the intensity of illumination, that is, deterioration in visibility of the rear display unit 50 due to the pattern of the light guide panel.

Although the prism sheet 45 is described as being attached to the inner circumferential portion of the opening 42 in the embodiment of the present invention, the inner circumferential surface of the opening 42 may be polished to be opaque instead of or together with the prism sheet 45. In this case, since light of the second light source 43 is uniformly dispersed at the inner circumferential portion of the opening 42, a clear reflected image of the second light source 43 is prevented from being formed on the rear display unit 50.

Further, according to the present invention, the light shielding tape 48 is attached along the outer circumference of the opening 42 of the second light guide panel 41 to prevent light emitted from the second light source 43 from reaching the rear display unit 50 along the outer circumference of the opening 42 of the second light guide panel 41, thereby preventing unnecessary reflection of light.

A rotary reel display unit is provided as the rear display unit 50 of the present embodiment. In the rotary reel display unit, a reel band 54 is attached to an outer peripheral surface of the rotary reel 52 and symbol marks (not shown) are attached to the reel band 54. A rear display lighting unit 56 for illuminating the symbol marks is disposed inside or outside the rotary reel 52. Thus, the rotary reel 52 is illuminated by the rear display illuminating unit 56 so that the rear display unit 50 is visible, and when the rotary reel 52 is rotated and then stopped, a game result is determined through combination of the symbol marks transmitted through the front display unit 10.

Figure 3:
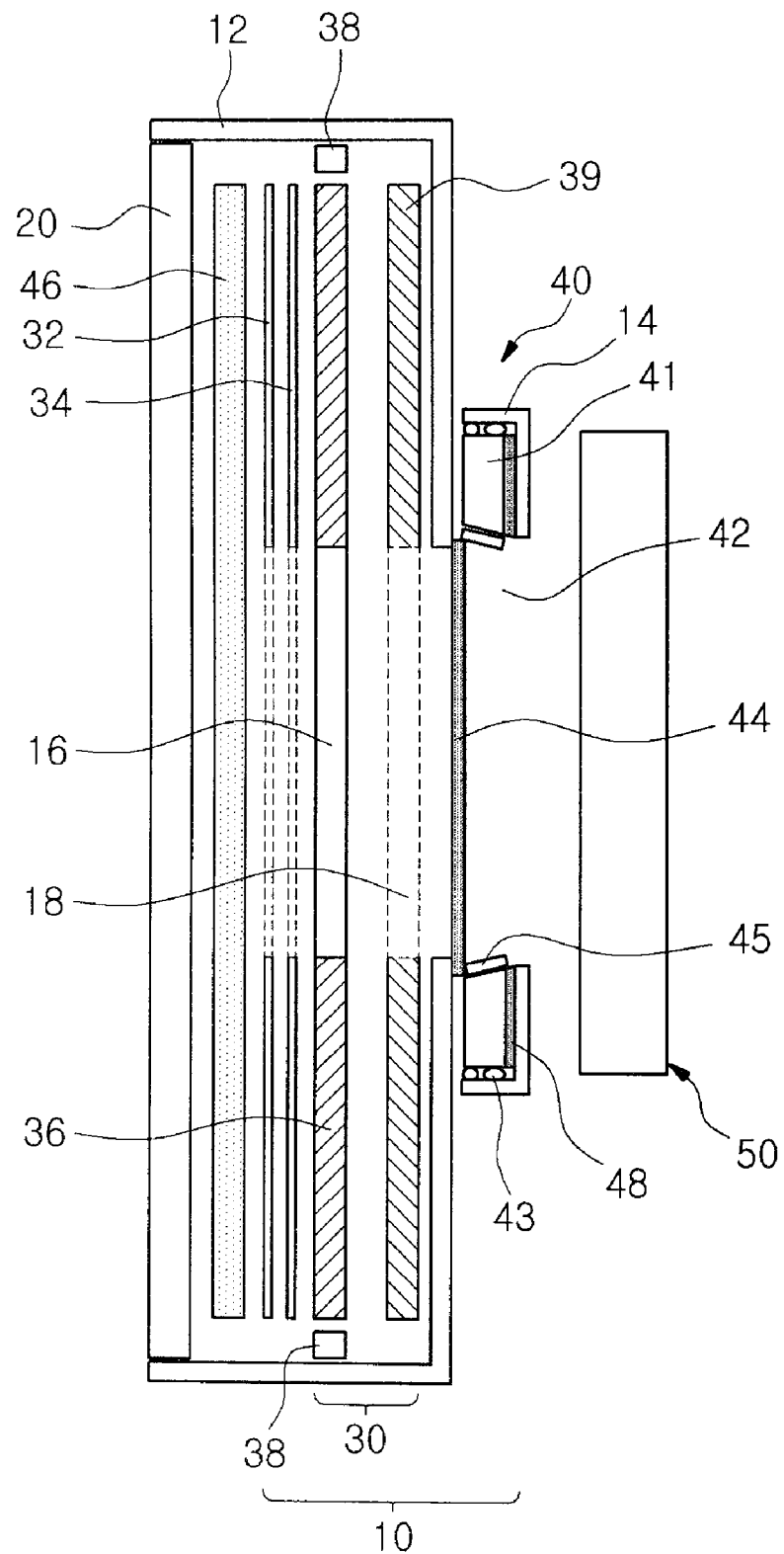
FIG. 3 is a sectional view of a display device in accordance with another exemplary embodiment of the present invention.

FIG. 3 shows another embodiment of the present invention, in which the rear display unit 50 is formed by a liquid display unit instead of the rotary reel display unit. In this way, the rear display unit 50 may be constituted by a liquid crystal display or other flat panel display devices so that symbol marks of a slot machine can be displayed through an image instead of a mechanical reel. However, according to the present invention, the rear display unit 50 may be realized by a picture or an article.

The invention claimed is:

1. A display device including a sub-backlight unit, comprising:
   a front display unit, the front display unit including a display panel; and
   a rear display unit disposed at a rear side of the front display unit to allow an image of the rear display unit to be visible through a portion of the front display unit;
   a first light guide panel disposed at a rear side of the display panel and having a transparent window through which the rear display unit is visible;
   a first light source disposed around the first light guide panel;
   a front backlight unit having a reflective sheet disposed at a rear surface of the first light guide panel to reflect light and having an image hole formed corresponding to the transparent window; and
   a sub-backlight unit disposed at a location corresponding to the transparent window on a rear side of the front backlight unit, wherein the sub-backlight unit includes: a second light guide panel having an opening corresponding to the transparent window, a second light source disposed at a circumference of the light guide panel, and a polymer dispersed liquid crystal (PDLC) sheet disposed close to a front side of the opening of the second light guide panel.

2. The display device according to claim 1, wherein an inner circumferential surface of the opening of the second light guide panel is an inclined surface enlarged from a rear side toward a front side.

3. The display device according to claim 2, wherein a prism sheet is attached to the inner circumferential surface of the opening of the second light guide panel.

4. The display device according to claim 2, wherein the inner circumferential surface of the opening of the second light guide panel is polished to be opaque.

5. The display device according to claim 1, wherein a light shielding tape is attached along an outer circumference of the opening of the second light guide panel.

6. The display device according to claim 1, wherein the rear display unit is a rotary reel display unit having a plurality of rows of variable images.

7. The display device according to claim 1, wherein the rear display unit is one of an LCD, a PDP, an OLED, and an AMOLED.

8. The display device according to claim 1, wherein the rear display unit is a picture or an article representing an image.

9. The display device according to claim 1, wherein the transparent window of the first light guide panel is an opening formed corresponding to a location of the rear display unit.

10. The display device according to claim 1, wherein a patterned-area section on which a pattern is printed is formed on an area of the first light guide panel outside the transparent window, and a non-patterned area section on which a pattern is not printed is formed on an area of the first light guide panel corresponding to the transparent window.

* * * * *